United States Patent

[11] 3,564,141

[72] Inventor Robert N. Hurst
Haddonfield, N.J.

[21] Appl. No. 884,773
[22] Filed Dec. 23, 1969
[45] Patented Feb. 16, 1971
[73] Assignee RCA Corporation
Continuation of application Ser. No. 686,426, Nov. 29, 1967.

[54] SYNC REGENERATOR
12 Claims, 9 Drawing Figs.

[52] U.S. Cl. .......... 178/69.5, 178/6.6
[51] Int. Cl. .......... H04n 5/04, H04n 5/78
[50] Field of Search .......... 178/69.5, 69.5 (TV), 6.6 (A)

[56] References Cited

UNITED STATES PATENTS 2,944,108 7/1960 Houghton .......... 178/69.5(TV)

*Primary Examiner*—Richard Murray
*Attorney*—Edward J. Norton

ABSTRACT: A sync regenerator for totally reproducing the television sync signal for a broadcast that has been recorded on video tape, where the reproduced sync signal is generated by the application of a single chain of pulses to a series of monostable multivibrators which are responsive to pulses generated by a logic circuit. This sync regenerator may also be arranged so that any selected one of the sync signals of the various international television standards may be reproduced by simply changing a few switch settings.

INVENTOR
ROBERT N. HURST

BY Edward J. Norton
ATTORNEY

INVENTOR
ROBERT N. HURST
BY Edward J. Norton
ATTORNEY

INVENTOR
ROBERT N. HURST
BY Edward J Norton
ATTORNEY

INVENTOR
ROBERT N. HURST
BY Edward J. Norton
ATTORNEY

INVENTOR
ROBERT N. HURST

BY Edward J Norton
ATTORNEY

INVENTOR
ROBERT N. HURST

BY Edward J. Norton
ATTORNEY

INVENTOR
ROBERT N. HURST

BY Edward J Norton
Attorney

SYNC REGENERATOR

This is a continuation of my copending application Ser. No. 686,426, filed Nov. 29, 1967 and now abandoned.

BACKGROUND OF THE INVENTION

This invention relates to a new and more economical method of generating, or regenerating, any desired one of the several international sync signals.

A commercial television picture, such as the one seen on the home receiver, is composed of a certain number of narrow lines, where each segment of every line varies in color intensity, from black to white in monochrome telecasting or from color to color in is further telecasting, in response to the video signal transmitted to the receiver. To have a meaningful picture, it is necessary for each line to be in the proper vertical position and for each segment of each line to be in the proper horizontal position.

To have this meaningful picture, it is therefore necessary to synchronize the lines so that a first group are traced from the top to the bottom of the picture tube and then a second group are traced from top to bottom and so forth. It is further necessary to synchronize each line so that it begins at a fixed time after the preceding one.

This synchronization is done by having the receiver respond to the width and frequency of various sync pulses in various manners. For instance, certain pulses require that a new line be traced at the top of the tube rather than after a previously traced one.

Throughout the world there are several types of television standards and, as a consequence, several types of television sync signals. For example, in the United States, lines are traced at the rate of 15,750 per second while every one-sixtieth of second, tracing begins at the top of the tube.

To achieve horizontal synchronization, that is to have each line begin at the proper time, a chain of horizontal pulses at the line frequency of the standard selected and conforming to certain standards regarding form and width set by the Federal Communications Commission is transmitted, so that each pulse separates two individual lines. The response of the receiver to the horizontal pulse is to stop tracing the line it has been tracing and begin tracing a new line, the video signal for which immediately follows this horizontal pulse.

To achieve vertical synchronization, that is to have the lines begin retracting from the top of the tube again, is more difficult, and is done differently for each of the several standards. In the United States, for instance, a chain of six serrated pulses at twice the line frequency constitute the effective portion of the vertical sync. Each serrated pulse is relatively wide and each chain of the six serrated pulses occurs every one-sixtieth of a second. Each serrated pulse further must comply in form and width to the standards set the Federal Communications Commission. Wherever these six pulses occur, the receiver's response is to trace the next line transmitted to it at the top of the tube.

It has also been found that it is best to separate the six serrated pulses from the horizontal sync pulses. Hence, in the United States, a chain of six equalizing pulses, each pulse having a relatively narrow width, and the chain having a frequency of twice the line frequency, is inserted on each side of the chain of six serrated pulses. As a result, the total vertical sync signal in the United States is composed of six equalizing pulses, six serrated pulses and six equalizing pulses, where the three chains of six pulses together require the time that is necessary for nine lines to be traced.

In the normal live television broadcast, the various pulses constituting the sync signal are generated simultaneously with the picture signal and the two signals are transmitted as one television signal to the receiver. However, if the television signal is recorded on video tape and later transmitted from the tape to the receiver, a certain distortion in waveform occurs, resulting in the sync signals not conforming with the set standards. Hence the picture received on the receiver may not be synchronized properly. In this case, it is necessary to generate a new sync signal which conforms in all respects to the one which was originally generated.

In the past, regeneration of the total sync signal has proved to be so expensive that often it was economically unfeasible. This is evidenced by the Federal Communications Commission's willingness to allow the distorted equalizing and serrated pulses of the original sync to be used, although the pulses may not have conformed to the required standards. Only the horizontal pulses were required to be regenerated. Examples of video tape recorders in which this limited regeneration was allowed include RCA models TRT–1 and TR–22.

By the use of my invention, it will now be economically feasible to totally regenerate the required sync signal so that the required standards are met.

Hence, it is the object of my invention to provide a device by which sync signals can be totally regenerated in an accurate and economical manner.

Since a sync regenerator is merely a sync generator which can be controlled in both frequency and phase by an external sync source or a clock, this device is equally applicable to original sync generation. Therefore, it is a further object of my invention to provide a device by which a sync signal can be economically and accurately generated.

A further object of my invention is to provide a device which can easily and economically be switched to operate according to any one of the various international standards.

These and other objects of my invention will be readily apparent to those skilled in the art, particularly when taken in connection with the accompanying drawings, wherein.

FIRST PREFERRED EMBODIMENT (FIG. 1)

Figure 1:
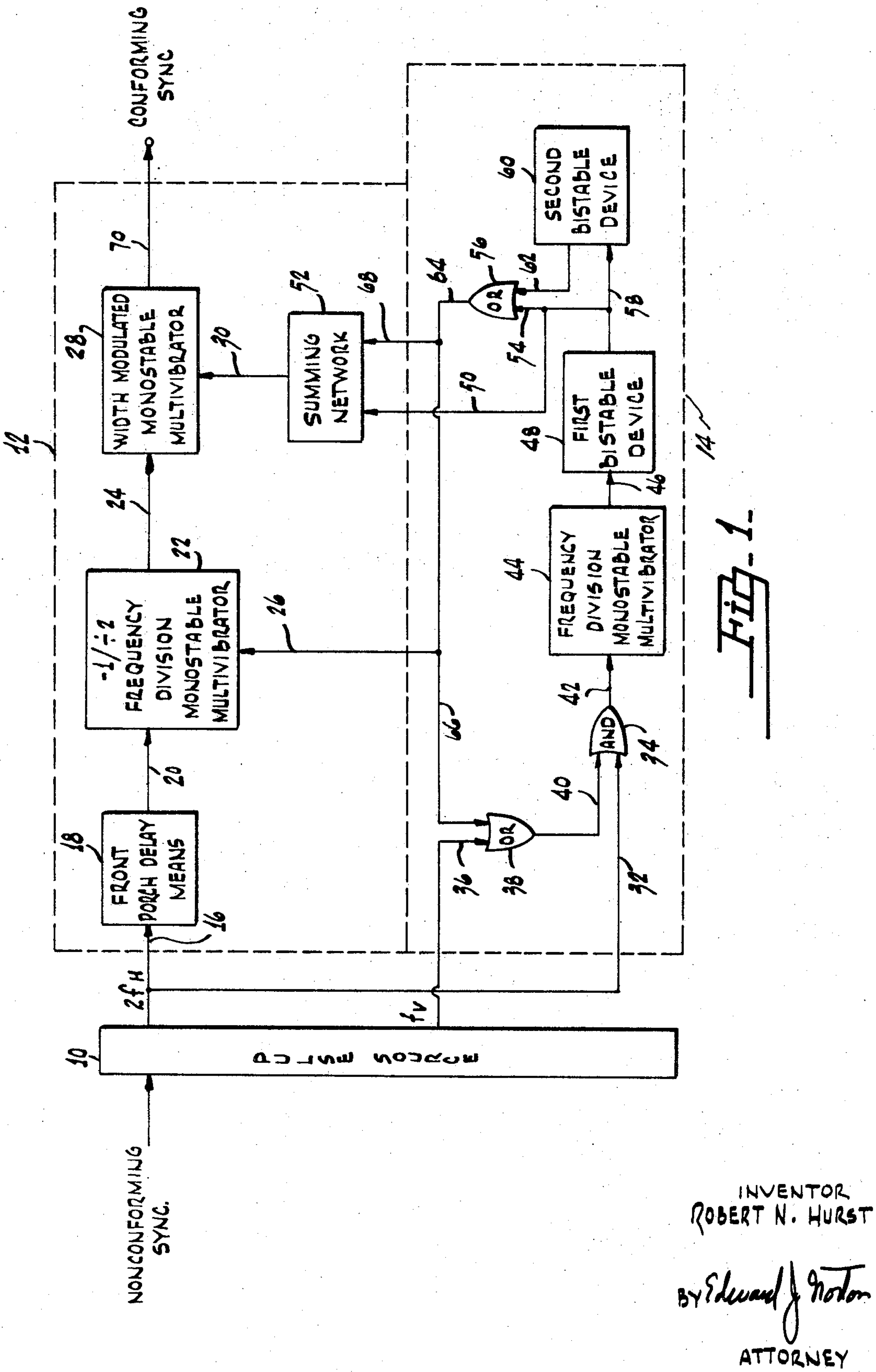
FIG. 1 represents a first preferred embodiment of this invention.

A first preferred embodiment of this invention is shown in FIG. 1. The sync regenerator is composed of pulse source 10, pulse generating circuit 12, and logic circuit 14.

Pulse source 10 consists of a master oscillator and various frequency dividing networks arranged so that two chains of pulses of frequencies $2f_h$ and $f_v$ respectively are generated, where $f_h$ is the frequency of the horizontal sync and therefore the line frequency and $f_v$ is the frequency of the vertical sync and therefore the field frequency. In the case where a distorted sync signal reproduced from a record medium is to be regenerated, the distorted sync signal is fed to the power source 10 which generates the pulse chains of frequencies $2f_h$ and $f_v$ as above. The master oscillator and dividing networks are controlled so that the phase and frequency of the two chains of pulses are determined according to that of the received distorted sync signal. Where original sync generation is desired, the pulse source 10 can be designed to generate independent of outside signals the two pulse chains as above.

Logic circuit 14, which will hereinafter be described in detail, generates pulses which control the frequency and width of the pulses constituting the final sync signal. This is accomplished by controlling the time constants of the monostable multivibrators which constitute elements of the pulse generating circuit 12.

The $2f_h$ chain of pulses is supplied to the pulse generating circuit 12 through line 16. Since this same chain is used to generate horizontal blanking after having its frequency divided by two, and because the horizontal blanking pulses begin prior in time to the horizontal sync pulses, it is necessary to pass the chain of pulses appearing on line 16 through front porch delay means 18. Delay means 18 may be, for example, a delay multivibrator or a delay line, each of which are well known in the art.

The delayed chain of pulses is then applied through line 20 to 1/2 frequency division monostable multivibrator 22 which normally divides the frequency of the delayed $2f_h$ chain of pulses by two, so that a chain of pulses of frequency $f_h$ is applied to line 24.

However, when a signal appears on line 26, multivibrator 22 will only divide the frequency of the delayed $2f_h$ chain of pulses by one, so that the chain of pulses appearing on line 24 remains at the frequency of $2f_h$. One method by which this may be accomplished is to change the time that division multivibrator 22 remains in the unstable state to less than the time between each of the $2f_h$ pulses when a pulses appears on line 26.

This in turn, could be accomplished by inserting a current source in place of the resistor which normally defines the time constant of a monostable multivibrator and having the current source respond to the signal appearing on line 26, in such a manner that the current from the current source is applied to the base of the normally off transistor. This increases the effective resistance of the multivibrator and therefore the effective time constant, is reduced.

The output signal of the division multivibrator 22 is applied through line 24 to width modulated monostable multivibrator 28 in such a manner that the leading edge of each pulse of the signal triggers width modulated multivibrator 28. This may be accomplished by differentiating the pulse chain, clipping the negative portion and using the positive portion to trigger width modulated monostable multivibrator 28.

The output pulses of width modulated monostable multivibrator 28 will vary in width in response to the signal appearing on line 30. This width modulation may be accomplished by inserting a controlled current source in the width modulated monostable multivibrator that is responsive to the signal appearing on line 30 and which varies the time constant in the same manner as was described above.

LOGIC CIRCUIT

The signals appearing on lines 26 and 30 that are used to control pulse generating circuit 12 are generated by logic circuit 14. The $2f_h$ chain of pulses from pulse source 10 is applied through line 32 to one input of AND gate 34. The $f_v$ chain of pulses is applied through line 36 to one input of OR gate 38, the output of which is applied through line 40 to a second input of AND gate 34. The output of AND gate 34 is applied through line 42 to frequency division monostable multivibrator 44. The leading edge of the pulses applied to this device will trigger it to the unstable state if it is in the stable state. When for instance, it is desired to divide the frequency by six, the time required to change the multivibrator from the unstable to the stable state would be the time required for more than six, but fewer than sever, input pulses to be applied to it. One method of having the leading edge of the pulses appearing on line 42 trigger frequency division monostable multivibrator 44 is to pass them through a differentiating circuit, and then clip the negative portion of the differentiated wave before it is applied to frequency division monostable multivibrator 44.

The output pulses of frequency division monostable multivibrator 44 are applied through line 46 to first bistable device 48, which may be a conventional flip-flop circuit. The normally "off" output of first bistable device 48 is applied through line 50 to summing network 52, through line 54 to OR gate 56, and through line 58 to second bistable device 60, which also may be a conventional flip-flop circuit. The normally "off" output of second bistable device 60 is applied through line 62 to the second input of OR gate 56. The output of OR gate 56 is applied through lines 64 and 66 to the second input of OR gate 38, and through lines 64 and 68 to the second input of summing network 52. The output of summing network 52 is the pulse appearing on line 30, which controls the width of the pulses generated by width modulated monostable multivibrator 28. Line 26 is connected through lines 66 and 64 to the output of OR gate 56.

OPERATION OF LOGIC CIRCUIT (FIG. 2)

Figure 2:
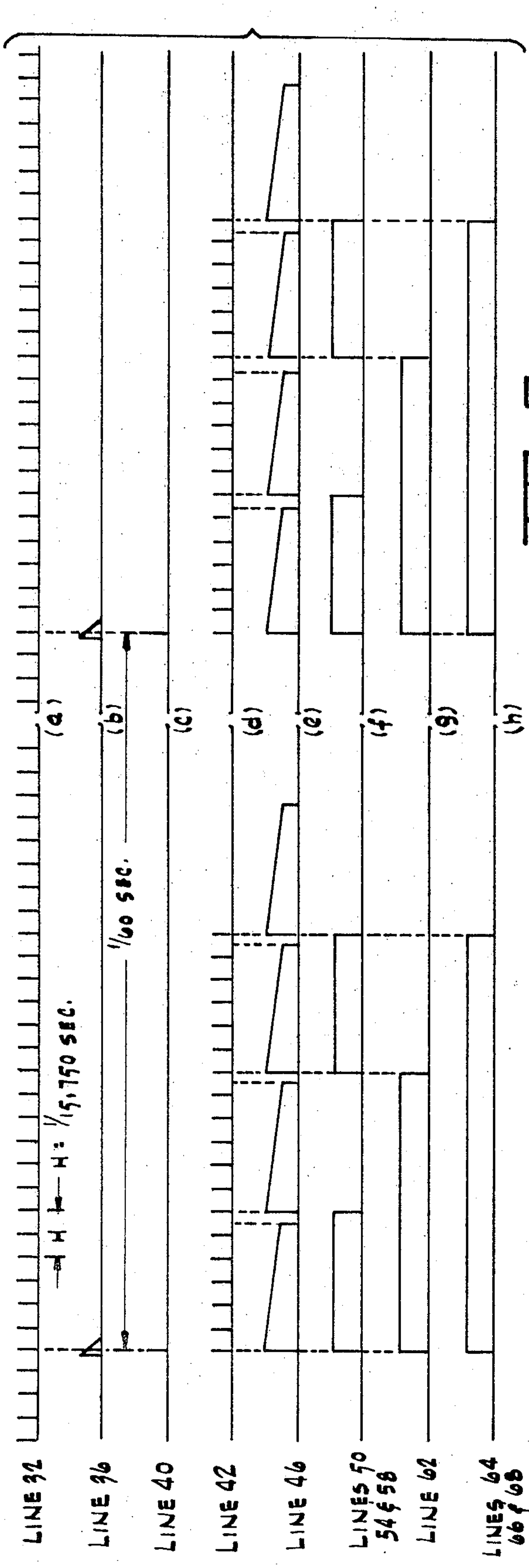
FIG. 2 represents the pulses formed in the logic network.

In order to understand the operation of logic circuit 14, reference is made to FIG. 2, which shows, using the American 525 line television sync standard as an example, the pulses appearing on the various lines of logic circuit 14. FIG. 2a shows the chain of pulses of frequency $2f_h$, 31,500 Hz, which appears on line 32. FIG. 2b shows the chain of pulses of frequency $f_v$, 60 Hz, which appear on line 36 and which pass through OR gate 38 and hence also appear on line 40. Whenever a pulse appears on lines 32 and 40 simultaneously, AND gate 34 will open and allow a pulse to appear on line 42. This pulse is shown in FIG. 2c.

The leading edge of this first pulse appearing on line 42 triggers the frequency division monostable multivibrator 44 to its unstable state which creates a pulse on line 46. The leading edge of this pulse triggers first bistable device 48 to its "on" state creating a pulse on line 58. The leading edge of the pulse on line 58 triggers second bistable device 60 to the "on" state creating a pulse on line 62.

When first bistable device 48 is triggered to the "on" state, a pulse also appears on line 54, and OR gate 56 opens. Hence, a pulse appears on line 64. Since line 64 is connected through line 66 to the second input of OR gate 38, a pulse continues to appear on line 40. Hence, when the next $2f_h$ pulse appears on line 34, AND gate 34 will reopen and allow a second pulse to appear on line 42. Pulses will continue to appear on line 42 until no pulse appears on line 40. In the case of the American sync standard, frequency division monostable multivibrator 44 must be set to divide by six. Since the first pulse that appeared on line 42 triggered it "on," the second through sixth pulses will not affect it, or the remainder of logic circuit 14. However, when the seventh pulse reaches frequency division monostable multivibrator 44, it will have changed back to its stable state and, hence, will be retriggered. This creates a new leading edge on line 46 which triggers first bistable device 48 "off." Since second bistable device 60 is still in the "on" state however, a pulse remains on line 62 and passes through OR gate 56, through lines 64 and 66, and through OR gate 38, to line 40. Hence, pulses continue to pass through AND gate 34.

When the thirteenth pulse on line 42 reaches frequency division monostable multivibrator 44, it retriggers it, creating a new leading edge on line 46, thereby retriggering first bistable device 48 "on." This creates a new leading edge on line 58 which triggers second bistable device 60 "off." Since first bistable device 48 is "on" a signal appears on line 54, which passes through OR gate 56, lines 64 and 66 and OR gate 38, to line 40, and thereby AND gate 34 continues to pass pulses to line 42.

The nineteenth pulse appearing on line 42 again triggers frequency division monostable multivibrator 44, creating a new leading edge on line 46, which triggers first bistable device 48 "off." Now since both bistable devices 48 and 60 are in the "off" state, OR gate 56 closes, so that a signal no longer appears on line 66, and hence no signal appears on line 40. This closes AND gate 34, and no further pulses will appear on line 42, until the next $f_v$ pulse appears on line 36.

FIG. 2d shows the chain of pulses that appear on line 42; FIG. 2e shows the chain of pulses that appear on line 46; FIG. 2f shows the output pulses of first bistable device 48, which appear on lines 50, 54 and 58; FIG. 2g shows the output pulses of second bistable device 60 appearing on line 62; and FIG. 2h shows the output pulses of OR gate 56 appearing on lines 26, 64, 66 and 68.

If H is defined as the time interval between leading edges of pulses of frequency $f_h$, then FIG. 2*f* comprises two separate pulses, each of duration 3H, the spacing therebetween also having a duration 3H. This will hereinafter be referred to as the 3H/3H/3H pulse signal. FIG. 2*g* is a single pulse of 6H duration and will be referred to as the 6H pulse signal, and FIG. 2*h* is a single pulse of 9H duration and will be referred to as the 9H pulse signal.

OPERATION OF PULSE GENERATING CIRCUIT (FIGS. 1, 3 AND 4)

The American standard sync signal, appearing on line 70, is formed by pulse generating circuit 12 and its response to the 3H/3H/3H and the 9H pulses. When the logic circuit 14 is not generating pulses, pulse generating circuit 12 produces horizontal sync pulses. The delayed $2f_h$ chain of pulses appearing on line 20 is divided by two in frequency by division multivibrator 22 so that a chain of pulses of frequency $f_h$ (15,750 Hz) appears on line 24. The leading edge of these pulses trigger width modulated multivibrator 28, which generates the desired horizontal pulses.

However, when logic circuit 14 operates, equalizing or serrated sync pulses are produced. The 9H pulse appearing on line 26 causes division multivibrator 22 to divide the frequency of the pulses applied to it by one. During this time eighteen pulses of frequency $2f_h$ (31,500 Hz) appear on line 24. The leading edge of each of these pulses triggers width modulated monostable multivibrator 28 to the unstable state so that it generates either the equalizing or serrated pulses, depending upon the value of the signal appearing on line 30.

Figure 3:
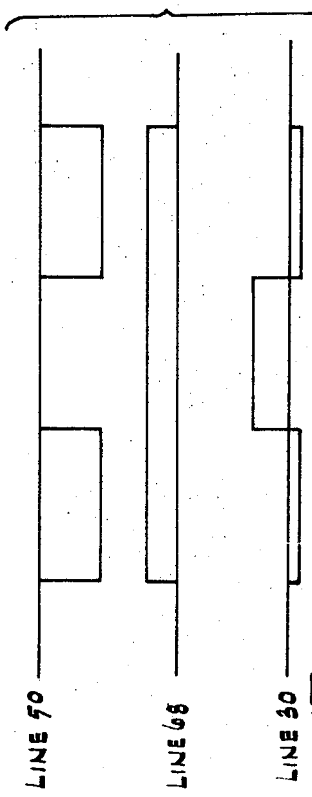
FIG. 3 represents the pulse formed by the summing network in the first preferred embodiment.

The signal appearing on line 30 may conveniently be designated a modulation pulse. Reference to FIG. 3 shows how this pulse is obtained. FIG. 3*a* shows the 3H/3H/3H pulse appearing on line 50; and FIG. 3*b* shows the 9H pulse appearing on line 68. By the use of necessary inverters and voltage dividers the two pulses can be made so that, when they are added, the modulation pulse appearing in FIG. 3*c* is obtained. During the first and third 3H periods of the modulation pulse, width modulated multivibrator 28 generates equalizing pulse and during the second 3H period, it generates serrated pulses.

Figure 4:
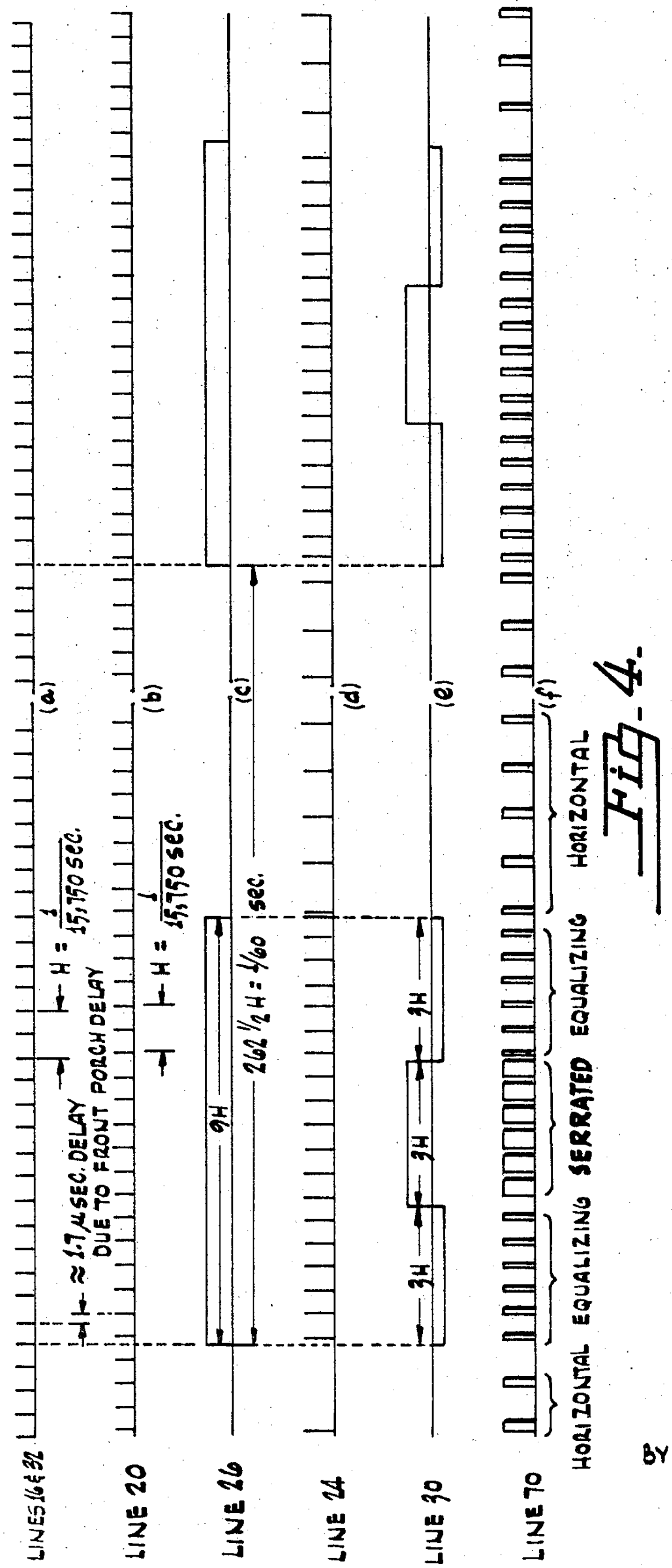
FIG. 4 represents the pulses formed in the pulse generating network of the first preferred embodiment.

The operation of pulse generating circuit 12 is shown graphically in FIG. 4. FIG. 4*a* shows the $2f_h$ chain of pulses appearing on line 16 that is applied to front porch delay means 18. FIG. 4*b* shows the delayed $2f_h$ chain of pulses appearing on line 20 which trigger division multivibrator 22. FIG. 4*c* shows the 9H pulse signal appearing on line 26 which controls the factor by which division multivibrator 22 will divide. FIG. 4*d* shows the output pulses of division multivibrator 22 which appears on line 24, and the leading edge of which triggers width modulated monostable multivibrator 28. FIG. 4*e* shows the modulation pulse appearing on line 30 which controls the width of the pulses generated by width modulated monostable multivibrator 28. FIG. 2*f* represents the output signal of width modulated monostable multivibrator 28, which appears on line 70.

SECOND PREFERRED EMBODIMENT (FIG. 5)

Figure 5:
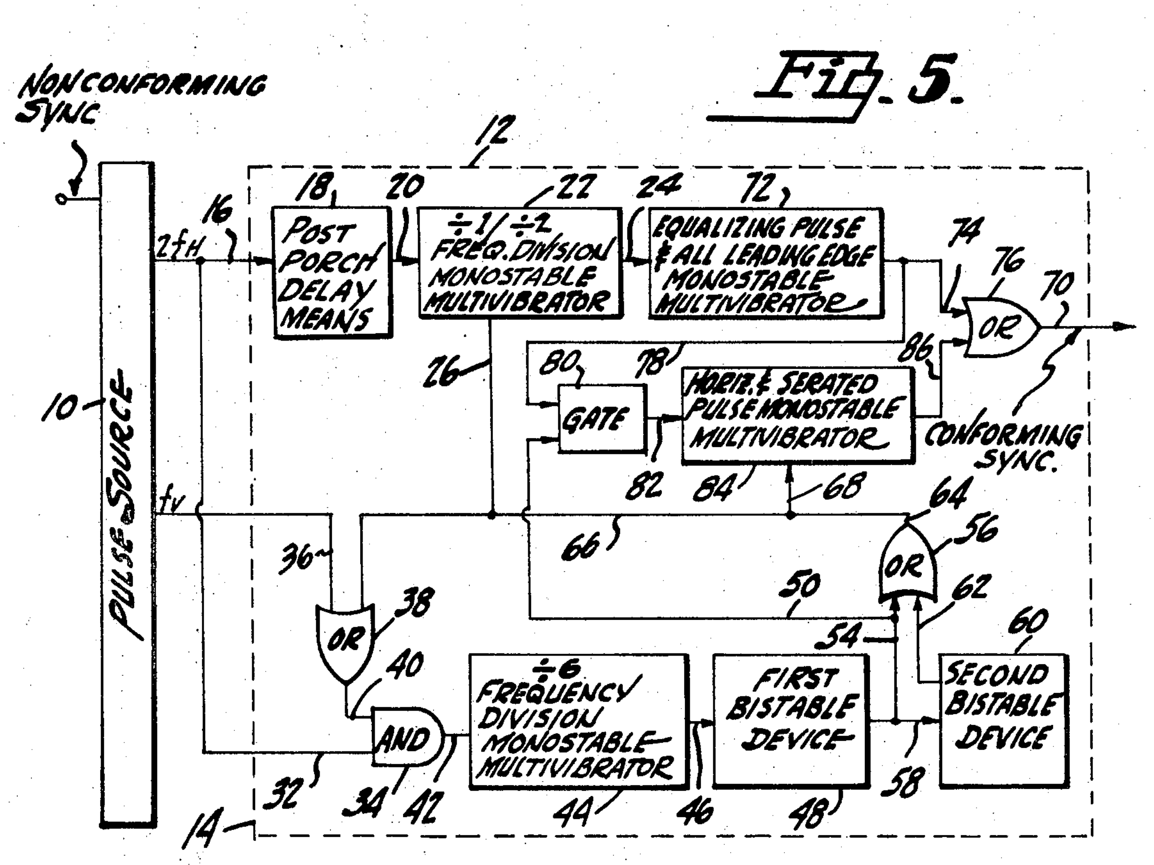
FIG. 5 represents a second preferred embodiment of my invention.

A second preferred embodiment of this invention for use where the American sync standard is desired, is shown in FIG. 5. In FIG. 5 identical numerical designations have been retained for components structurally and functionally identical to those shown in FIG. 1 and a detailed description of identical operations of these components will be omitted.

In FIG. 5, the leading edge of the pulses of the signal appearing on line 24, which are generated in the same manner as in FIG. 1, are used to trigger equalizing-pulse and all-leading-edge monostable multivibrator 72. Multivibrator 72 is designed to always generate at its output, pulses having a very similar leading edge and having the equalizing pulse width. The output of multivibrator 72 is applied through line 74 to OR gate 76 and through line 78 to gate 80. The 3H/3H/3H pulse signal appearing on line 50 is also applied to gate 80, which is designed to open only when a signal appears on line 78 and no signal appears on line 50. Hence, when the pulses of the 3H/3H/3H pulse signal exist, gate 80 will be inhibited.

The leading edge of the pulses that appear at the output of gate 80 are applied through line 82 to trigger horizontal and vertical pulse monostable multivibrator 84. Multivibrator 84 is designed to normally generate pulses of the width of the horizontal pulses, but wherever the 9H pulse signal appears on line 68, it will, when triggered, generate pulses of the width of the serrated pulses. One manner by which this may be accomplished is by varying the time constant of multivibrator 84, through the insertion of a controlled current source in place of the resistor by which the time constant is determined, in the same manner as has been previously explained. The output signal of multivibrator 84 is applied through line 86 to OR gate 76, the output of which represents the desired sync signal.

It should first be noted that whenever a pulse of the 3H/3H/3H pulse signal appears on line 50, gate 80 is inhibited, and hence multivibrator 84 is not triggered. Thus, when this happens, only equalizing pulses from multivibrator 72 are present at the output of OR gate 76.

It should also be noted that the output pulses of multivibrator 72, appearing on line 74, will reach OR gate 76 slightly before the output pulses of multivibrator 84. Therefore, the leading edges of all of the pulses of the sync signal will be formed by multivibrator 72, which is designed to produce very similar leading edges. Hence, the leading edge of all of the various pulses of the sync signal will be very precise, although only one precision monostable mulitvibrator is required.

Figure 6:
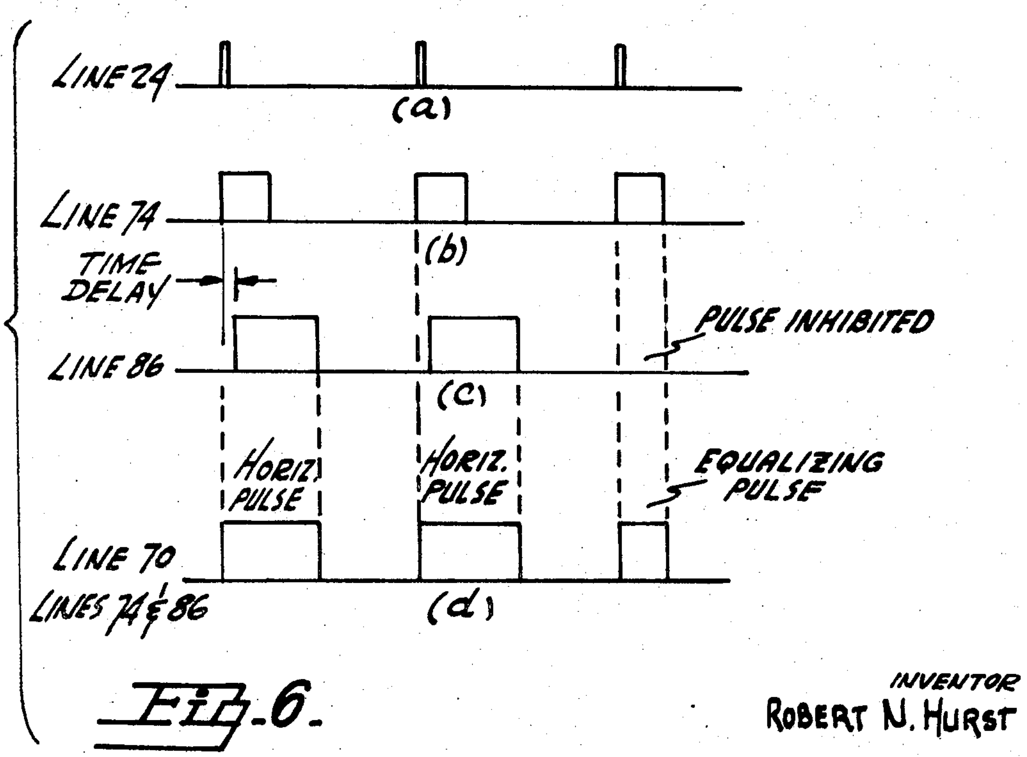
FIG. 6 represents the formation of the leading edge in the second preferred embodiment.

FIG. 6 represents a graphic illustration of the formation of the leading edge of the pulses constituting the sync signal. FIG. 6*a* shows the pulses appearing on line 24 which trigger multivibrator 72. FIG. 6*b* represents the output of multivibrator 72, and FIG. 6*c* represents the output of multivibrator 84. FIG. 6*d* represents the output of OR gate 76.

Figure 7:
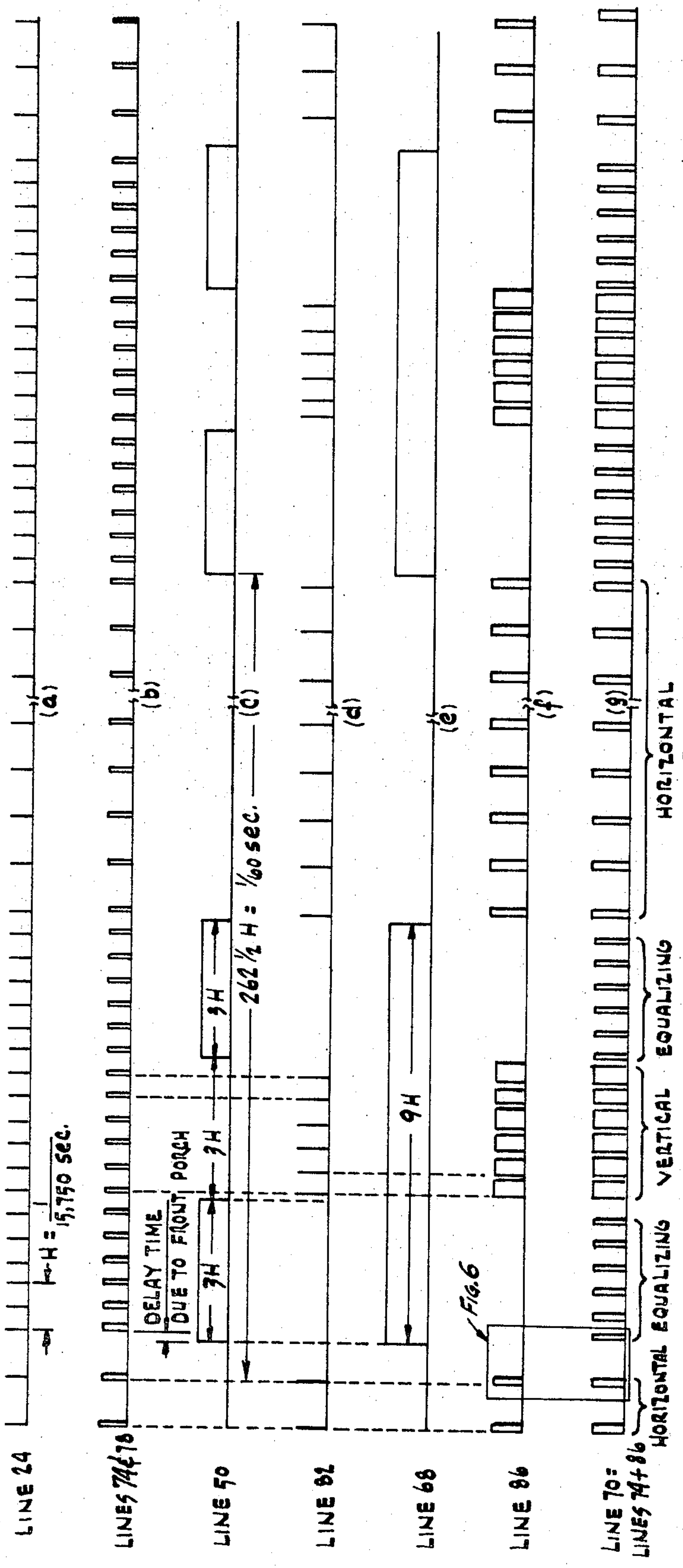
FIG. 7 represents the pulses formed in the pulse generating network of the second preferred embodiment.

The operation of the second embodiment is shown graphically in FIG. 7. FIG. 7*a* represents the chain of pulses appearing on line 24, which trigger multivibrator 72. FIG. 7*b* represents the output pulses of multivibrator 72 which are applied through line 74 to OR gate 76 and through line 78 to gate 80. FIG. 7*c* represents the 3H/3H/3H pulse signal appearing on line 50 which is applied to gate 80 to inhibit it when equalizing pulses are desired. FIG. 7*d* represents the signal at the output of gate 80 which appears on line 82 and which triggers multivibrator 84. FIG. 7*e* represents the 9H pulse signal appearing on line 68 which controls the width of the pulses generated by multivibrator 84. FIG. 7*f* represents the output of multivibrator 84 appearing on line 86, which is applied to OR gate 76. FIG. 7*g* represents the output of OR gate 76 appearing on line 70, which is the desired American sync standard.

INTERNATIONAL SWITCHING (FIG. 8)

Figure 8:
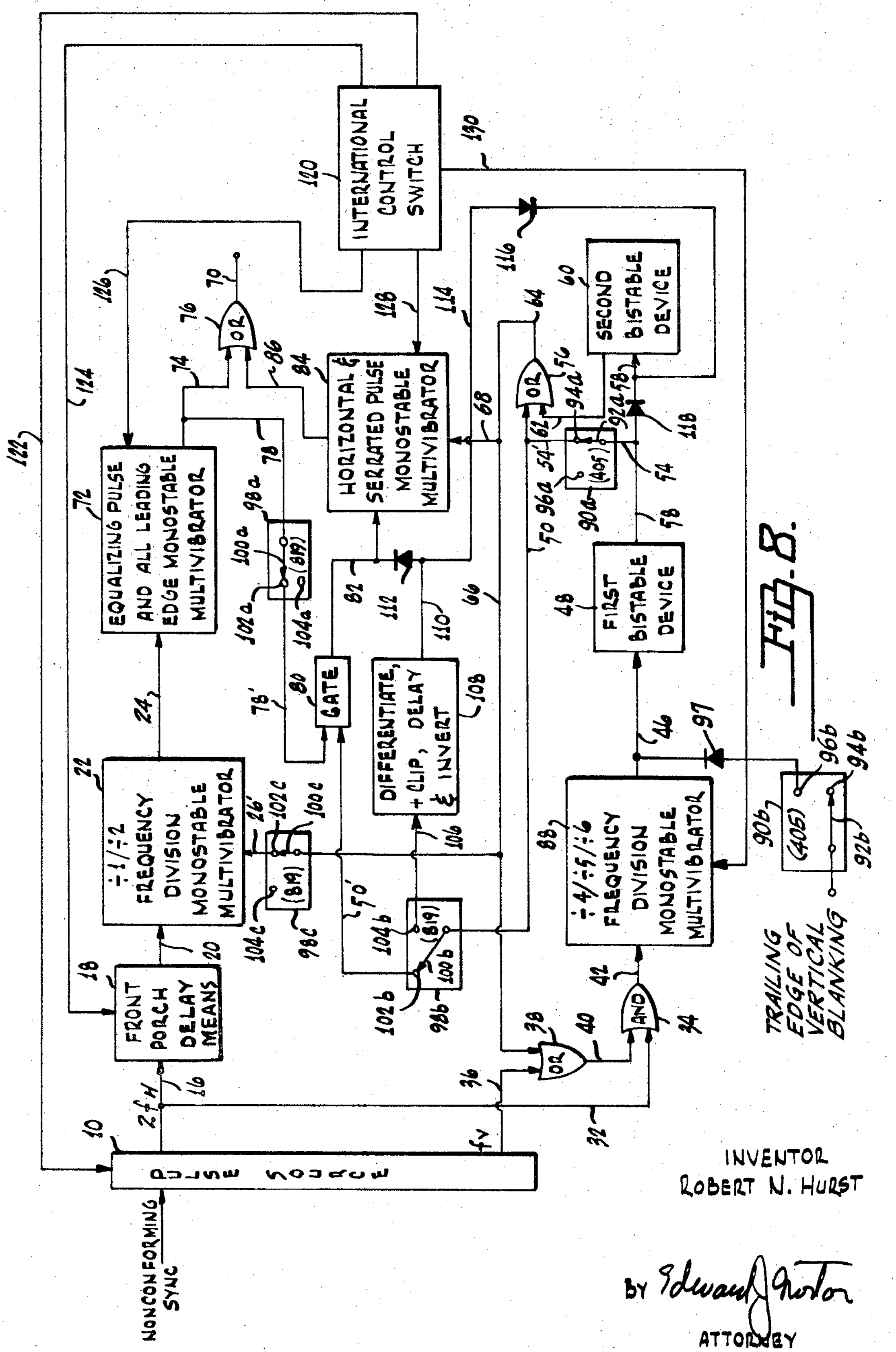
FIG. 8 represents a method by which the second preferred embodiment can be switched to generate any one of the various international sync signals.
Figure 9:
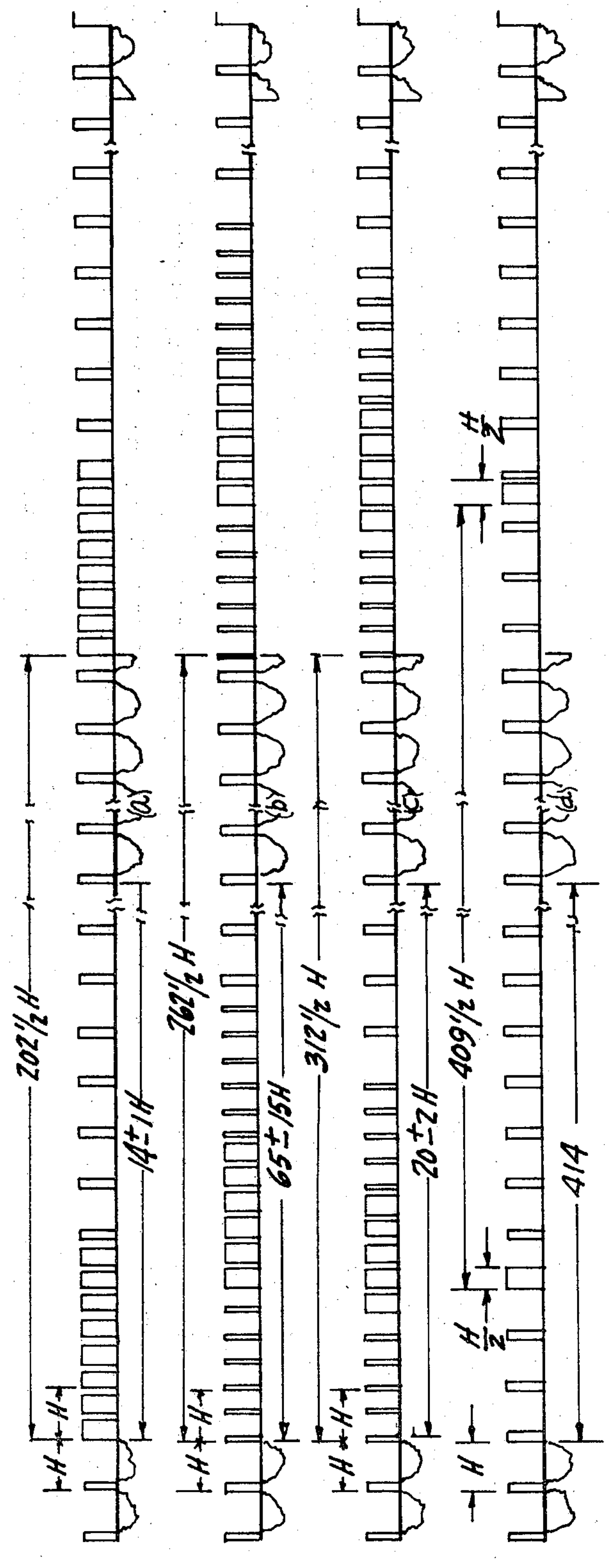
FIG. 9 represents the four international sync signals.

In many instances, it may be desirable to be able to use the second preferred embodiment to selectively generate a sync standard other than the American sync standard. FIG. 8 shows the additional components that are added to the second embodiment so that it is capable of generating the sync signal for the English 405–line standard, the American 525–line standard, the European 625–line standard, or the French 819–line standard. FIG. 9 represents a diagram of these various standards wherein FIG. 9*a* is the English 405–line sync standard, FIG. 9*b* is the American 525–line standard, FIG. 9*c* is the European 625–line standard, and FIG. 9*d* is the French 819–line standard.

The frequency division monostable multivibrator 44 of FIG. 4 must be changed to a 4/5/6 frequency division monostable multivibrator 88, which is capable of dividing the frequency of a chain of pulses applied to it by either four, five or six. It will be set to divide by six where the 525 and 819–line sync signals are desired, to divide by five where the 625–line sync signal is desired, and to divide by four where the 405–line sync signal is desired.

It is further necessary to add two bank switch 90 having first bank 90a and second bank 90b, where the respective banks have switching arms 92a,92b, first terminals 94a,94b and second terminals 96a,96b. Also there is added a three bank switch 98 having first bank 98a, second bank 98b and third bank 98c, where the respective banks have switching arms 100a, 100b, 100c first terminals 102a, 102b, 102c and second terminals 104a, 104b, 104c respectively as shown. Switch 90a is inserted in line 54 between the output of first bistable device 48 and OR gate 56 in such a manner that switching arm 92a is coupled through line 54 to the output of first bistable device 48, first terminal 94a is coupled through line 54' to the first input of the second OR gate 56 and second terminal 96a is disconnected from the system. Switch 90b is inserted between the vertical-blanking multivibrator (not shown) and first bistable device 48. The signal applied to switching arm 92b is a pulse corresponding in time to the trailing edge of the vertical-blanking signal. Terminal 96b is coupled through diode 97 to the input of the first bistable device and terminal 94b is disconnected from the circuit. For operation at the 525, 625 or 819–line standards, switching arms 92a, 92b are at their respective first terminals 94a, 94b, while for operation at the 405–line standard, switching arms 92a, 92b are at their respective second terminal 96a, 96b.

The first bank 98a of the three bank switch 98 is inserted in line 78 between the output of multivibrator 72 and the input of gate 80 so that switching arm 100a is coupled through line 78 to the output of multivibrator 72; the first terminal 102 is coupled through line 78' to the input of gate 80 and second terminal 104a is disconnected from the circuit. Switching arm 100a is at the second terminal 104a only when a 819–line sync signal is desired, and is at the first terminal 102a when the 405, 525 and 625–line sync signals are desired.

The second bank 98b of the three bank switch, 98 is inserted in line 50 between the first terminal 94a of switch 90a of two bank switch 90 and the input of gate 80 so that the switching arm 100b is coupled through line 50 to the first terminal 94a of the switch 90a and the first terminal 102b is coupled through the line 50' to the input of gate 80. The second terminal 104b is coupled through line 106 to a differentiating, positive clipping, delaying and inverting circuit 108, the output of which is coupled through line 110 and through diode 112 to the input of multivibrator 84. The output of circuit 108 is also coupled through line 114 and diode 116 to the input of second bistable device 60. Diode 118 is placed between the output of first bistable device 48 and the input of second bistable device 60. The switching arm 100b is at the second terminal 104b when an 819–line sync signal is desired, and is at the first terminal 102a when the 405, 525 and 625–line sync signals are desired.

The third bank 98c of the three bank switch 98 is inserted in line 26 between the output of OR gate 56 and the control input of division multivibrator 22 so that the switching arm 100c is coupled through lines 26, 66 and 64 to the output of OR gate 56, the first terminal 102c, is coupled through line 26' to the control input of division multivibrator 22, and the second terminal 104c is not connected to the system. The switching arm 100c is at the second terminal 104c when an 819–line sync signal is desired, and is at the first terminal 102c when the 405, 525 and 625–line sync standards are desired.

A final change is the addition of an international control switch, 120, for changing the frequency of $f_h$ and $f_v$ in pulse source 110, by its response to the signal on line 122; for changing the delay time of the front porch delay means 18 by its response to the signal on line 124; for changing the time constant of multivibrator 72, by its response to the signal on line 126; for changing the time constant of multivibrator 84 by its response to the signal on line 128; and for changing the division ratio of the 4/5/6 frequency division monostable multivibrator 88 through its response to the signal on line 130. Each of the various sync signals will require a different setting on at least some of these components, so the international control switch will be switched to a different position for each of them.

The operation of the circuit in FIG. 8 for the 525–line sync signal was described in detail above, and will not be again repeated. To operate at the 625–line standard, it is only necessary to change the 4/5/6 frequency division monostable multivibrator 88 to a divide by five setting. By the same analysis that was used above, it is seen that this results in a 7½H pulse signal at the output of OR gate 56 and a 2½H/2½H/2½H pulse signal at the output of first bistable device 48. This results in a vertical sync signal of five equalizing, five serrated, and five equalizing pulses.

When operating at the 405–line standard, 4/5/6 frequency division monostable multivibrator 88 is set to divide by four, and respective switching arms 92a, 92b of each bank 90a, 90b, of the two bank switch 90 are placed at their respective second terminals 96a, 96b. Hence, the output of OR gate 56 is merely a 4H wide pulse signal. The output of first bistable device 48 need not be connected to gate 80 since there are no equalizing pulses in the 405–line system. Therefore, multivibrator 84 is never inhibited. This results in a vertical sync signal comprising a chain of eight serrated pulses at twice the line frequency, and no equalizing pulses. Since the first bistable device will be in the "on" state when logic network 14 is disabled it will be reset, in this instance only, by the trailing edge of the vertical blanking signal triggering it after passing through switching arm 92b, second terminal 96b and diode 97.

When operating at the 819–line standard, 4/5/6 frequency division monostable multivibrator 88 is set to divide by six, switching arms 92a, 92b of each bank 90a, 90b of two bank switch 90 are set at the first terminals 94a, 94b thereof, and switching arms 100a, 100b, 100c of each of banks 98a, 98b, 98c, respectively of the three bank switch 98 are at the second terminals 104a, 104b, 104c thereof. Since the control signal on line 26 is not then applied to the division multivibrator 22, the division multivibrator 22 always divides the frequency of the pulses applied to it by two. Further, since multivibrator 72 no longer triggers multivibrator 84, so multivibrator 72 must be set to generate pulses having the width of the horizontal sync pulses rather than the width of equalizing pulses.

Further, in the 819–line standard, when first bistable device 48 and second bistable device 60 are first triggered on, a pulse appears on line 66 and this allows further pulses to pass through AND gate 34. The leading edge of the first pulse from first bistable device 48 is applied through line 50 to the switching arm 100b of the second bank 98b of the three bank switch 98. From there, it passes through the second terminal 104b of the second bank 98b of the three bank switch 98 and through line 106 to circuit 108, where the leading edge is differentiated and clipped, so nothing yet appears at the output of circuit 108. After first bistable device 40 is triggered "off," a trailing edge is applied to circuit 108, and in this instance, since the negative portion is not clipped, a signal appears on line 110. The delay time of circuit 108 is set so a pulse appears on line 110 only when a pulse appears on line 20. The pulse on line 110 triggers multivibrator 84 which generates one wide pulse that is applied to OR gate 76. This pulse represents the French vertical sync. The signal on line 110 is also applied through line 114 and diode 116 to the input of second bistable device 60 and used to trigger it "off" so that the logic circuit is then disabled until the next $f_v$ pulse occurs.

I claim:

1. A sync regenerator for deriving, as an output, a television sync signal, composed of a series of pulses of the proper preselected widths and timing relationship therebetween in accordance with at least one predetermined television standard from a first chain of pulses occurring at a relatively high repetition rate that is a certain integral multiple, including unity, of the line frequency of said one predetermined television standard and a second chain of pulses occurring at a relatively low repetition rate which is equal to the field frequency of said one predetermined television standard, wherein each of said second chain of pulses occurs in time coincidence with a pulse of said first chain of pulses, whereby the time period between successive pulses of said second chain of pulses is equal to a given plural integral number of time intervals, each of which is defined by successive pulses of said first chain of pulses, said sync regenerator comprising:

a. first means for producing an output pulse in response to each input pulse applied thereto when in a first condition thereof, and for producing an output pulse in response to each pair of successive input pulses applied thereto when in a second condition thereof, and for preselecting which one of said first and second conditions prevails during each one of said time intervals of each time period in accordance with said one predetermined television standard;
b. second means for producing an output pulse in response to each and every input pulse being applied thereto said output pulse having any chosen one of a given number of preselected widths, and for preselecting which of said given number of preselected widths is the chosen one during each separate ordinal one of said time intervals of each time period in accordance with said one predetermined television standard;
c. third means for applying a single input pulse to said first means during each and every one of said time intervals; and
d. fourth means for applying each output pulse from said first means as an input pulse to said second means, whereby the output pulses obtained from said second means constitute the output of said sync regenerator.

2. The invention according to claim 1, wherein said first means comprises:

a. a code generating means for generating a coded signal having a first code during a certain initial fixed number of time intervals commencing with the beginning of each of said time periods and a second code during the subsequent time intervals of each of said time periods in response to the application of said first and second chains of pulses to said first generating means;
b. a switchable frequency dividing means having said first and second conditions, said switchable frequency dividing means producing said output pulses of said first means in response to said input pulses of said first means being applied thereto; and
c. control means coupled between said code generating means and said switchable frequency dividing means for switching said switchable frequency dividing means to said first condition thereof during the occurrence of said first code and for switching said switchable frequency dividing means to said second condition thereof during the occurrence of said second code.

3. The invention according to claim 2, which comprises an international control switch for changing said certain initial fixed number of time intervals during which said first code exists.

4. The invention according to claim 1, wherein said second means further comprises:

a. a code generating means for generating a coded signal in response to the application of said first and second chains of pulses, said coded signal having a plurality of codes including a first code which exists during a first certain initial fixed number of time intervals commencing with the beginning of each of said time periods and a second code which exists during a second certain fixed number of the remaining time intervals of each of said time periods;
b. a switchable pulse generating means for producing said output pulses of said second means in response to each and every one of said input pulses of said second means being applied thereto, said switchable pulse generating means having a plurality of states each of which corresponds respectively to a different preselected width of an output pulse; and
c. control means coupled between said code generating means and said switchable generating means for switching said switchable generating means to a first one of said states thereof during the occurrence of said first code and for switching said switchable generating means to a second one of said states thereof during the occurrence of said second code.

5. The invention according to claim 4:

a. wherein said switchable pulse generating means further comprise a switchable monostable multivibrator; and
b. wherein said control means further comprises a converting means for converting said coded signal into a switching signal having a distinct level during the presence of each of said codes and means for applying said switching signal to said switchable monostable multivibrator for determining which of said states of said switchable pulse generating means exists.

6. The invention according to claim 4:

a. wherein said switchable pulse generating means further comprises:
   1. a first monostable multivibrator for producing at an output thereof, certain of output pulses produced by said second means, wherein said output pulses of said first monostable multivibrator have a width which corresponds to a first one of said given number of preselected widths, said pulses being produced in response to each and every one of said input pulses of said second means;
   2. a switchable monostable multivibrator having at least one state for producing at an output thereof, the remaining output pulses produced by said second means, said pulses being produced in response to each and every input pulse applied to an input thereof;
   3. first gating means, responsive to said coded signal, for applying said output pulses of said first monostable multivibrator as said input pulses of said switchable monostable multivibrator for certain preselected codes of said coded signal, and for applying no pulses to said input of said switchable monostable multivibrator for the remaining codes of said coded signal;
   4. second gating means having a first input coupled to said output of said first monostable multivibrator, a second input coupled to said output of said switchable monostable multivibrator, and an output at which are produced said output pulses of said second means; and
b. wherein said control means further comprises:
   1. means for coupling said code generating means to said switchable monostable multivibrator, and for switching said switchable monostable multivibrator between said states thereof in response to each code of said coded signal; and
   2. means for coupling said code generating means to said first gating means.

7. The invention according to claim 4, wherein said code generating means comprises an international control switch for changing the number of separate codes that constitute said coded signal, for changing said initial fixed number of time intervals during which said first code exists, and for changing said second certain fixed number of time intervals during which said second code exists.

8. The invention according to claim 1, wherein said third means further includes a delay circuit having a certain preselected delay time in accordance with said one predetermined television standard, to which is applied said first chain of pulses and which produces a delayed chain of pulses at an output thereof which is applied to said first means.

9. A sync generator for deriving, as an output, a television sync signal, composed of a series of pulses of the proper preselected widths and timing relationship therebetween in accordance with at least one predetermined television standard from a first chain of pulses occurring at a relatively high repetition rate that is a certain integral multiple, including unity, of the line frequency of said one predetermined television standard and a second chain of pulses occurring at a relatively low repetition rate which is equal to the field frequency of said one predetermined television standard, wherein each of said second chain of pulses occurs in time coincidence with a pulse of said first chain of pulses, whereby the time period between successive pulses of said second chain of pulses is equal to a given plural integral number of time intervals, each of which is defined by successive pulses of said first chain of pulses, said sync generator comprising:

a. first means for producing an output pulse in response to each input pulse applied thereto when in a first condition thereof, and for producing an output pulse in response to each pair of successive input pulses applied thereto when in a second condition thereof, and for preselecting which one of said first and second conditions prevails during each one of said time intervals of each time period in accordance with said one predetermined television standard;

b. second means for producing an output pulse in response to each and every input pulse being applied thereto, said output pulse having any chosen one of a given number of preselected widths, and for preselecting which of said given number of preselected widths if the chosen one during each separate ordinal one of said time intervals of each time period in accordance with said one predetermined television standard;

c. third means for applying a single input pulse to said first means during each and every one of said time intervals; and d. fourth means for applying each output pulse from said first means as an input pulse to said second means, whereby the output pulses obtained from said second means constitute the output of said sync generator.

10. The invention according to claim 9, wherein said first means comprises:

a. a code generating means for generating a coded signal having a first code during a certain initial fixed number of time intervals commencing with the beginning of each of said time periods and a second code during the subsequent time intervals of each of said time periods in response to the application of said first and second chains of pulses to said first generating means;

b. a switchable frequency dividing means having said first and second conditions, said switchable frequency dividing means producing said output pulses of said first means in response to said input pulses of said first means being applied thereto; and c. control means coupled between said code generating means and said switchable frequency dividing means for switching said switchable frequency dividing means to said first condition thereof during the occurrence of said first code and for switching said switchable frequency dividing means to said second condition thereof during the occurrence of said second code.

11. The invention according to claim 9, wherein said second means further comprises:

a. a code generating means for generating a coded signal in response to the application of said first and second chains of pulses, said coded signal having a plurality of codes including a first code which exists during a first certain initial fixed number of time intervals commencing with the beginning of each of said time periods and a second code which exists during a second certain fixed number of the remaining time intervals of each of said time periods;

b. a switchable pulse generating means for producing said output pulses of said second means in response to each and every one of said input pulses of said second means being applied thereto, said switchable pulse generating means having a plurality of states each of which corresponds respectively to a different preselected width of an output pulse; and c. control means coupled between said code generating means and said switchable generating means for switching said switchable generating means to a first one of said states thereof during the occurrence of said first code and for switching said switchable generating means to a second one of said states thereof during the occurrence of said second code.

12. The invention according to claim 9, wherein said third means further includes a delay circuit having a certain preselected delay time in accordance with said one predetermined television standard, to which is applied said first chain of pulses and which produces a delayed chain of pulses at an output thereof which is applied to said first means.